United States Patent
Lee et al.

(10) Patent No.: US 10,793,020 B2
(45) Date of Patent: Oct. 6, 2020

(54) FUEL CELL VEHICLE SYSTEM AND METHOD OF CONTROLLING THE SAME

(71) Applicants: Hyundai Motor Company, Seoul (KR); Kia Motors Corporation, Seoul (KR)

(72) Inventors: Seung Hwan Lee, Jeollabuk-do (KR); Soon Il Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 194 days.

(21) Appl. No.: 15/997,288

(22) Filed: Jun. 4, 2018

(65) Prior Publication Data

US 2019/0152330 A1 May 23, 2019

(30) Foreign Application Priority Data

Nov. 22, 2017 (KR) .................. 10-2017-0156622

(51) Int. Cl.
| | | |
|---|---|---|
| *B60L 58/40* | (2019.01) | |
| *B60L 53/22* | (2019.01) | |
| *B60L 3/00* | (2019.01) | |
| *B60L 50/75* | (2019.01) | |

(52) U.S. Cl.
CPC .............. *B60L 58/40* (2019.02); *B60L 3/0046* (2013.01); *B60L 3/0053* (2013.01); *B60L 3/0061* (2013.01); *B60L 50/75* (2019.02); *B60L 53/22* (2019.02); *B60L 2210/10* (2013.01); *B60L 2220/42* (2013.01)

(58) Field of Classification Search
CPC .......... B60L 58/40; B60L 53/22; B60L 50/75; B60L 3/0046; B60L 3/0053; B60L 3/0061; B60L 2210/10; B60L 2220/42
See application file for complete search history.

(56) References Cited

U.S. PATENT DOCUMENTS

| | | | |
|---|---|---|---|
| 6,255,008 B1* | 7/2001 | Iwase ..................... | B60L 58/30 |
| | | | 429/9 |
| 2010/0194318 A1* | 8/2010 | Aso ....................... | H01M 8/0494 |
| | | | 318/400.3 |
| 2012/0187758 A1* | 7/2012 | Boskovitch .............. | B60K 6/46 |
| | | | 307/10.1 |
| 2013/0020863 A1 | 1/2013 | Sugiyama et al. | |

FOREIGN PATENT DOCUMENTS

| | | |
|---|---|---|
| JP | 2011-0111032 A | 6/2011 |
| JP | 2013-0027140 A | 2/2013 |
| KR | 10-0980278 B1 | 9/2010 |
| KR | 10-1000594 B1 | 12/2010 |
| KR | 10-2012-0106379 | 9/2012 |
| KR | 10-2017-0012794 | 2/2017 |

* cited by examiner

*Primary Examiner* — Yazan A Soofi
*Assistant Examiner* — Naeem Taslim Alam
(74) *Attorney, Agent, or Firm* — Mintz Levin Cohn Ferris Glovsky and Popeo, P.C.; Peter F. Corless

(57) ABSTRACT

A fuel cell vehicle system is provided. The system includes a fuel cell and a first motor that is connected to the fuel cell via a first bus terminal and driven by power supplied from the fuel cell and that provides power to driving wheels of the vehicle. A high voltage battery stores or supplies power by charging or discharging. Additionally, a second motor is connected to the high voltage battery via a second bus terminal and driven by power supplied from the high voltage battery and provides power to the driving wheels of the vehicle.

3 Claims, 12 Drawing Sheets

FUEL CELL VEHICLE SYSTEM AND METHOD OF CONTROLLING THE SAME

CROSS REFERENCE TO RELATED APPLICATION

The present application claims priority to Korean Patent Application No. 10-2017-0156622, filed on Nov. 22, 2017, the entire contents of which is incorporated herein for all purposes by this reference.

BACKGROUND

1. Technical Field

The present invention relates to a fuel cell vehicle system and a method of controlling the same, and more particularly, to a fuel cell vehicle system in which a front wheel and a rear wheel are connected to a fuel cell and a high voltage battery, respectively, and are driven individually.

2. Description of the Related Art

Research regarding hydrogen fuel cell vehicles using environmentally friendly fuel cells as alternative energy in the future is being actively conducted. The fuel cell generates electric energy through an electrochemical reaction using hydrogen as reaction gas. However, due to a structural problem of the fuel cell, it may be difficult to promptly supply power to a load when starting and to rapidly respond to a sudden change in load. In addition, since the fuel cell has optimal efficiency within a specific range of output density, the fuel cell may frequently deviate from a high-efficiency output density.

Further, since the fuel cell has only a characteristic of supplying power unilaterally, the fuel cell may not absorb or store regenerative power regenerated when a driving motor for a vehicle is stopped and therefore is disadvantageous for an efficient use of energy. Accordingly, a fuel cell vehicle generally includes a hybrid driving system in which a high voltage battery is mounted as an auxiliary energy source. However, a parallel type hybrid driving system conventionally used may require a substantially-sized bidirectional converter which may fit for a high power and have the reduced efficiency due to a power loss caused by the bidirectional converter.

The matters described as the background art have been provided merely for assisting in the understanding for the background of the present invention and should not be considered as corresponding to the related art known to those skilled in the art.

SUMMARY

An object of the present invention is to provide a power fuel cell vehicle system having a bidirectional converter by individually driving a front wheel and a rear wheel, respectively, with a fuel cell and a high voltage battery.

According to an exemplary embodiment of the present invention, a fuel cell vehicle system may include: a fuel cell; a first motor connected to the fuel cell via a first bus terminal and driven by power supplied from the fuel cell and configured to provide power to driving wheels of the vehicle; a high voltage battery configured to store or supply power by charging or discharging; and a second motor connected to the high voltage battery via a second bus terminal and driven by power supplied from the high voltage battery and configured to provide power to the driving wheels of the vehicle.

The first motor may provide power to some of the driving wheels of the vehicle, and the second motor may provide power to the other driving wheels of the vehicle. The fuel cell vehicle system may further include: a bidirectional direct current-direct current (DC/DC) converter positioned between the first bus terminal and the high voltage battery; and a controller configured to operate the bidirectional DC/DC converter to adjust a transmission of power between the first bus terminal and the high voltage battery.

The fuel cell vehicle system may further include: a first inverter positioned between the fuel cell and the first motor and configured to invert the power of the first bus terminal and supply the inverted power to the first motor; and a second inverter positioned between the high voltage battery and the second motor and configured to invert the power of the second bus terminal and supply the inverted power to the second motor. The fuel cell vehicle system may further include: a first relay directly connected between the first inverter and the second inverter to transmit the power of the first inverter to the second inverter. The controller may be configured to operate a first switch of the first relay to transmit or interrupt the power from the first inverter to the second inverter.

Additionally, the fuel cell vehicle system may further include: a second relay configured to directly transmit power from the bidirectional DC/DC converter to the second inverter by allowing the power to bypass the high voltage battery. The controller may be configured to operate a second switch of the second relay to transmit or interrupt the power from the bidirectional DC/DC converter to the second inverter. The controller may further be configured to drive the driving wheels of the fuel cell vehicle in any one of an electric vehicle (EV) mode in which the fuel cell vehicle is driven by the power of the high voltage battery, a fuel cell (FC) Only mode in which the fuel cell vehicle is driven by the power of the fuel cell, and a high output mode in which the fuel cell vehicle is driven using both of the power of the high voltage battery and the power of the fuel cell, based on a running state of the fuel cell vehicle.

The controller may be configured to operate the bidirectional DC/DC converter to transmit the power of the first bus terminal to the high voltage battery or transmit the power of the high voltage battery to the first bus terminal, based on a running state of the fuel cell vehicle. The controller may further be configured to operate the bidirectional DC/DC converter to drive an accessor device connected to the first bus terminal with the power of the high voltage battery to transmit the power of the high voltage battery to the first bus terminal, when the fuel cell starts. Additionally, the controller may be configured to operate the bidirectional DC/DC converter to supply energy regenerated from the first motor to the high voltage battery to transmit the power of the first bus terminal to the high voltage battery, at the time of regenerative braking. The controller may be configured to operate the bidirectional DC/DC converter to charge the high voltage battery with the power supplied from the fuel cell to transmit the power of the first bus terminal to the high voltage battery, when the fuel cell is operated.

According to another exemplary embodiment of the present invention, a method of controlling the fuel cell vehicle system may include: operating a driving wheel of a fuel cell vehicle in any one of an EV mode in which the fuel cell vehicle is driven by power of a high voltage battery, an FC Only mode in which the fuel cell vehicle is driven by power of the fuel cell, and a high output mode in which the fuel cell vehicle is driven using both of the power of the high voltage battery and the power of the fuel cell, based on a running state of the fuel cell vehicle.

According to another exemplary embodiment of the present invention, a method of controlling the fuel cell vehicle system may include: diagnosing a failure state of the fuel cell vehicle system; and operating a driving wheel of a fuel cell vehicle in a driving mode selected based on the diagnosed failure state. When the fuel cell is diagnosed as having failed in the diagnosing of the failure, in the operating of the driving wheel of the fuel cell vehicle, the driving wheel may be operated in a driving mode in which a first motor or a second motor is driven with the power of the high voltage battery.

When the second motor is diagnosed as having failed, in the operating of the driving wheel of the fuel cell vehicle, the bidirectional DC/DC converter may be operated to supply the power of the high voltage battery to a first bus terminal to operate the driving wheel in a driving mode in which the first motor is driven. When the high voltage battery is diagnosed as having failed, in the operating of the driving wheel of the fuel cell vehicle, the driving wheel may be operated in a driving mode in which the first motor or the second motor is driven with the power of the fuel cell. When the first motor is diagnosed as having failed, in the operating of the driving wheel of the fuel cell vehicle, the bidirectional DC/DC converter may be operated to provide the power of the first bus terminal to a second inverter to drive the second motor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
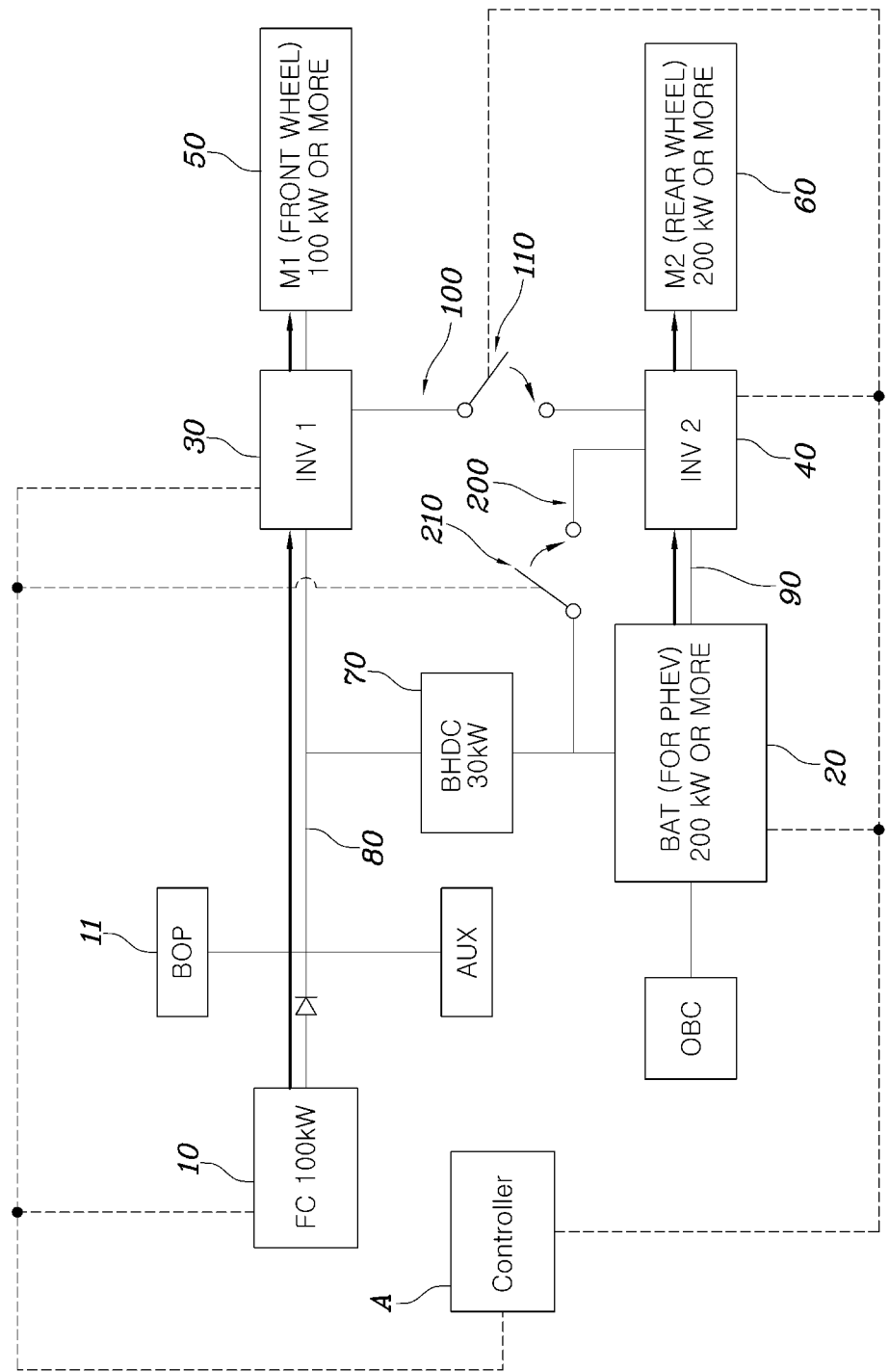
FIG. 1 is a configuration diagram of a fuel cell vehicle system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions in exemplary embodiments of the present invention disclosed in the present specification or the present application are illustrated to describe exemplary embodiments of the present invention and therefore, the exemplary embodiments of the present invention may be practiced in various forms and are not to be construed as being limited to the exemplary embodiment of the present invention disclosed in the present specification or the present application.

Since exemplary embodiments of the present invention may be variously modified and may have several forms, specific exemplary embodiments will be shown in the accompanying drawings and will be described in detail in the present specification or disclosure. However, it is to be understood that the present invention is not limited to the specific exemplary embodiments, but includes all modifications, equivalents, and substitutions included in the spirit and the scope of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. In addition, other expressions describing a relationship between components, that is, "between", "directly between", "neighboring to", "directly neighboring to" and the like, should be similarly interpreted.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in detail with reference to the accompanying drawings. Like reference numerals proposed in each drawing denote like components.

FIG. 1 is a configuration diagram of a fuel cell vehicle system according to an exemplary embodiment of the present invention. Referring to FIG. 1, a fuel cell vehicle system according to an exemplary embodiment of the present invention may include: a fuel cell 10; a first motor 50 connected to the fuel cell 10 via a first bus terminal 80 and driven by power supplied from the fuel cell 10 and configured to provide power to driving wheels of the vehicle; a high voltage battery 20 configured to store or supply power by charging or discharging; and a second motor 60 connected to the high voltage battery 20 via a second bus terminal 90 and driven by power supplied from the high voltage battery 20 and configured to provide power to the driving wheels of the vehicle.

The fuel cell 10 may be a fuel cell stack in which a reaction occurs by supplying hydrogen and oxygen, respectively, in which power generated by the chemical reaction may be supplied to the first bus terminal 80. The first bus terminal 80 may include a diode for preventing a flow of reverse current. The first bus terminal 80 may be connected to accessories (e.g., base of the pyramid (BOP)) 11 such as an air compressor and a coolant pump to supply power thereto, and may be connected to auxiliary (AUX) devices such as a low voltage battery to supply power thereto. The first bus terminal 80 may be configured to supply power to the first motor 50 through a first inverter 30.

The high voltage battery 20 may be charged to store power, or discharged to supply power. For a high-performance fuel cell vehicle, the high voltage battery 20 having a large capacity may be used. Further, a plug-in hybrid vehicle (PHEV) which is supplied with power externally from a vehicle to be charged may include an onboard charger (OBC). Alternatively, the high voltage battery 20 may be supplied with power supplied externally from the vehicle by an external charger to be charged, or may be charged in the vehicle with the power of the fuel cell 10 or the like without being plugged into the external power source.

The first motor 50 may be configured to provide power to a first group of the driving wheels of the vehicle and the second motor 60 may be configured to provide power to a second group of driving wheels (e.g., a remaining group) of the vehicle. In an exemplary embodiment of the present invention, the first motor 50 may be assumed to provide power to the front wheels and the second motor 60 may be assumed to provide power to the rear wheels, or vice versa. In other words, the first motor 50 and the second motor 60 may independently drive different driving wheels.

The fuel cell vehicle system according to an exemplary embodiment of the present invention may further include a bidirectional DC/DC converter 70 disposed between the first bus terminal 80 and the high voltage battery 20; and a controller (A) configured to adjust a power transmission between the first bus terminal 80 and the high voltage battery 20 by operating the bidirectional DC/DC converter 70. The controller (A) of the present invention may be an electronic controller (ECU) or a telecommunication controller (TCU), or a fuel cell controller (FCU) configured to operate the fuel cell system, or may be configured as a separate controller.

The voltages of the first bus terminal 80 and the second bus terminal 90 may be set differently. Specifically, in the present invention, the voltage of the first bus terminal 80 to which the fuel cell 10 is connected is relatively lower than the voltage of the second bus terminal 90 to which the high voltage battery 20 is connected. The bidirectional DC/DC converter 70 (BHDC) of the present invention may be disposed between the first bus terminal 80 and the high voltage battery 20 to connect between independent driving systems, and may be configured to convert a DC voltage between the independent driving systems having different voltages. The controller (A) may be configured to operate the bidirectional DC/DC converter 70 to control a transmission of power between the first bus terminal 80 and the high voltage battery 20. However, the present invention has the independent driving system in which the fuel cell 10 and the high voltage battery 20 are connected to the first motor 50 and the second motor 60, respectively, and thus does not require the large-capacity bidirectional DC/DC converter 70. In other words, according to the related art, when the fuel cell vehicle system has one driving system, a large-capacity bidirectional DC/DC converter 70 of about 200 kW is required. However, the fuel cell vehicle system includes the independent driving system, and thus a small-capacity bidirectional DC/DC converter 70 of about 30 [kW] may be sufficient. The capacity of the bidirectional converter may be set to be less than 50% of a maximum output of the fuel cell 10 or less than 50% of a maximum output of the battery. Further, since the fuel cell vehicle system is driven by the independent driving system, the converting of the bidirectional DC/DC converter 70 is not required, thereby preventing the power from being lost during the converting. Accordingly, the driving efficiency of the fuel cell vehicle may be improved.

The fuel cell vehicle system may further include: the first inverter 30 disposed between the fuel cell 10 and the first motor 50 and configured to invert the power of the first bus terminal 80 and supply the inverted power to the first motor 50; and a second inverter 40 disposed between the high voltage battery 20 and the second motor 60 and configured to invert the power of the second bus terminal 90 and supply the inverted power to the second motor 60. The first inverter 30 and the second inverter 40 may be configured to supply the inverted power to the first motor 50 and the second motor 60, respectively. However, when the high voltage battery 20 fails (e.g., malfunctions), power should be supplied from the fuel cell 10, and when the power is to be supplied to the second motor 60 (e.g., when the first motor 50 fails), the power should be supplied to the second inverter 40 by bypassing the high voltage battery 20.

According to an exemplary embodiment of the present invention, the fuel cell vehicle system may further include a first relay 100 directly connected between the first inverter 30 and the second inverter 40 to transmit the power of the first inverter 30 to the second inverter 40, and the controller (A) may be configured to operate a first switch 110 of the first relay 100 to transmit or interrupt the power from the first inverter 30 to the second inverter 20. The first relay 100 may be directly connected between the first inverter 30 and the second inverter 40 to transmit the power. However, the power may be transmitted from the relatively low voltage to the high voltage. Conversely, when the power is transmitted from the high voltage to the low voltage, components of the inverter or the motor may be damaged.

According to another exemplary embodiment of the present invention, the fuel cell vehicle system may further include a second relay 200 configured to directly transmit power from the bidirectional DC/DC converter 70 to the second inverter 40 by allowing the power to bypass the high voltage battery 20, in which the controller (A) may be configured to operate a second switch 210 of the second relay 200 to transmit or interrupt the power from the bidirectional DC/DC converter 70 to the second inverter 40. However, in this case, there may be a limitation that only the power corresponding to the power conversion capacity of the bidirectional DC/DC converter 70 is capable of being transmitted.

The controller (A) may be configured to operate the driving wheels of the fuel cell vehicle in any one of an EV mode in which the driving wheels of the fuel cell vehicle are driven by the power of the high voltage battery 20, an FC Only mode in which the fuel cell vehicle is driven by the power of the fuel cell 10, and a high output mode in which the fuel cell vehicle is driven using both of the power of the high voltage battery 20 and the power of the fuel cell 10, based on a running state of the fuel cell vehicle.

As illustrated in FIG. 1, for the running mode requiring the high power, by the independent driving system, the power of the fuel cell 10 may be supplied to the first motor 50 through the first inverter 30 and the power of the high voltage battery 20 may be supplied to the second motor 60 through the second inverter 40, and thus, the first motor 50 and the second motor 60 may each be driven individually. In FIG. 1, the arrows indicate paths through which power is supplied. FIGS. 2 to 6 illustrate various running modes according to an exemplary embodiment of the present invention. Referring to FIGS. 2 to 6, arrows indicate paths through which power is supplied, and hatched parts indicate a state in which they each are in operation. FIGS. 2 to 6 illustrate a driving mode other than the independent driving mode of FIG. 1.

Figure 2:
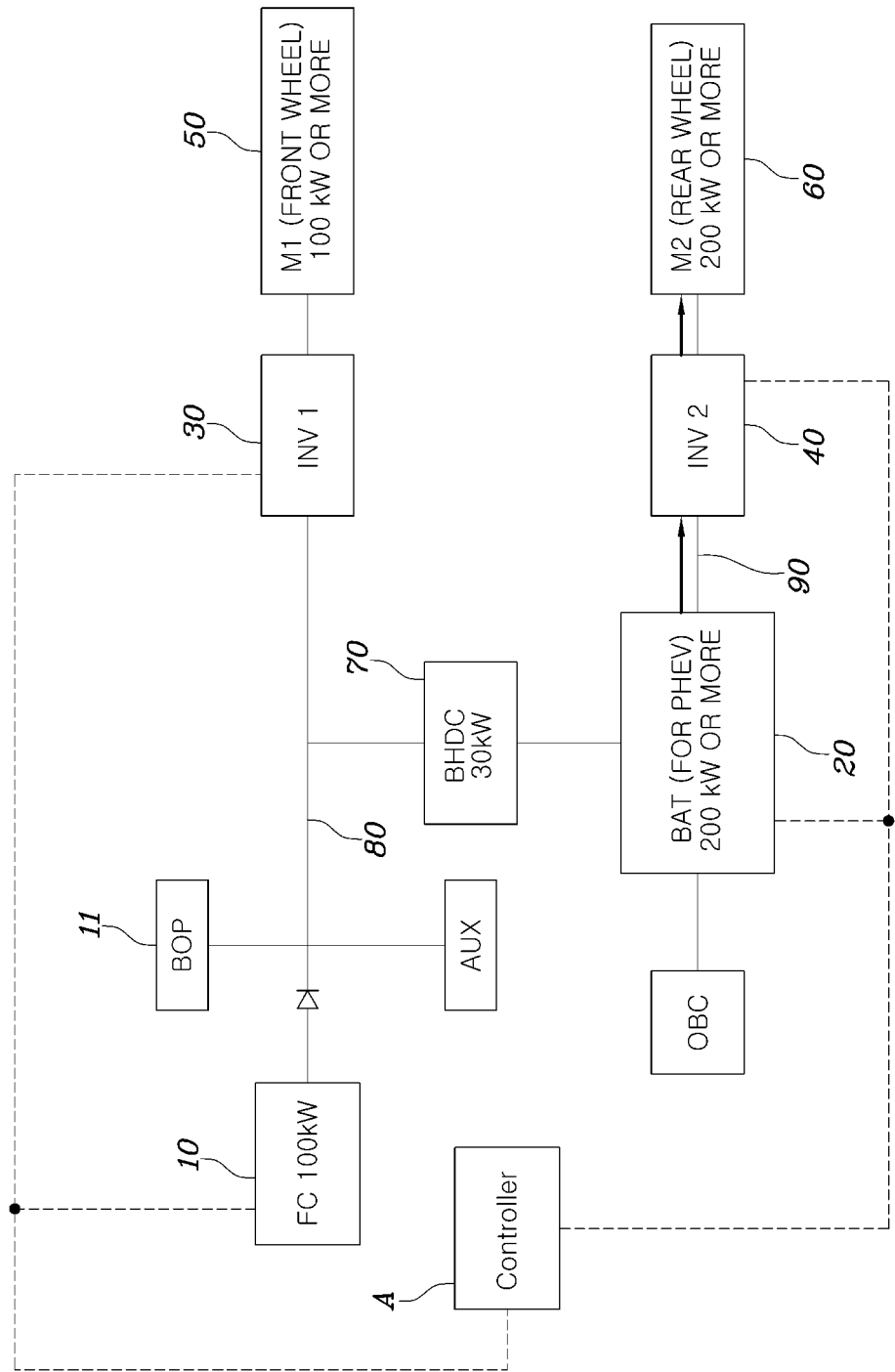
FIGS. 2 to 6 illustrate various running modes according to an exemplary embodiment of the present invention.

First, FIG. 2 illustrates the EV mode. In the EV mode, the driving wheels are driven or operated by the power of the high voltage battery 20 without being supplied with power from the fuel cell 10. The fuel cell vehicle may be operated in the corresponding mode before the fuel cell 10 starts in the initial stage of starting and may be operated in the corresponding mode in an urban running situation or the like requiring a low output.

FIG. 2 illustrates that the power supplied from the high voltage battery 20 drives the second motor 60 through the second inverter 40. However, it is also possible to drive the first motor 50 by supplying the power of the high voltage battery 20 to the first inverter 30 through the bidirectional DC/DC converter 70, if necessary.

Figure 3:
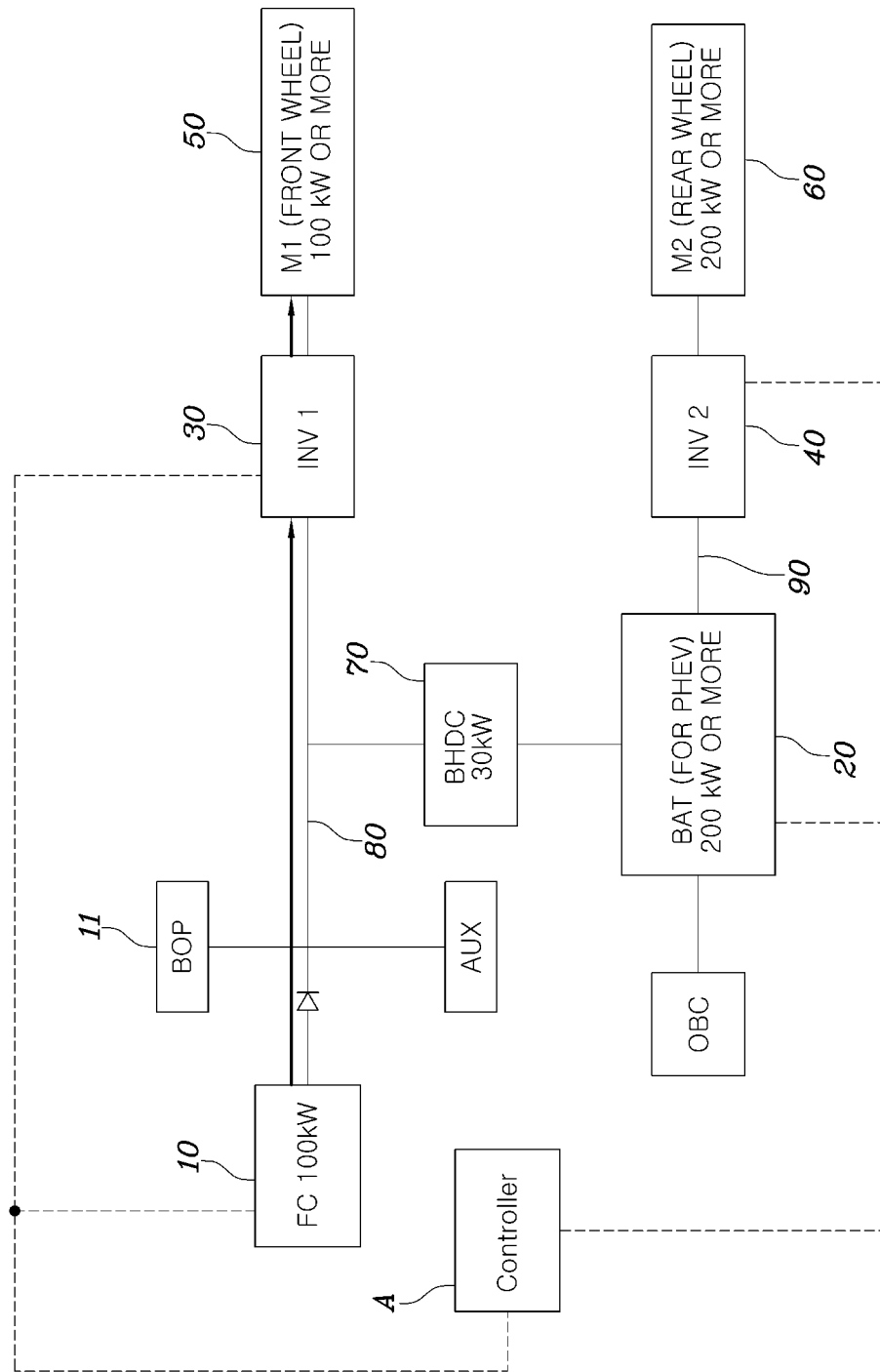

FIG. 3 illustrates the FC Only mode. In the FC Only mode, the fuel cell 10 supplies power but the high voltage battery 20 does not supply power. The fuel cell vehicle may be operated in the corresponding mode when a state of charge (SOC) of the high voltage battery 20 is insufficient and may be operated in the corresponding mode when the high voltage battery 20 or the surrounding systems fail or malfunction.

FIG. 3 illustrates that the power supplied from the fuel cell 10 drives the first motor 50 through the first inverter 30. However, it is also possible to drive the second motor 60 by directly transmitting the power of the fuel cell 10 to the second inverter 40 by bypassing the high voltage battery 20 through the bidirectional DC/DC converter 70, if necessary.

Figure 4:
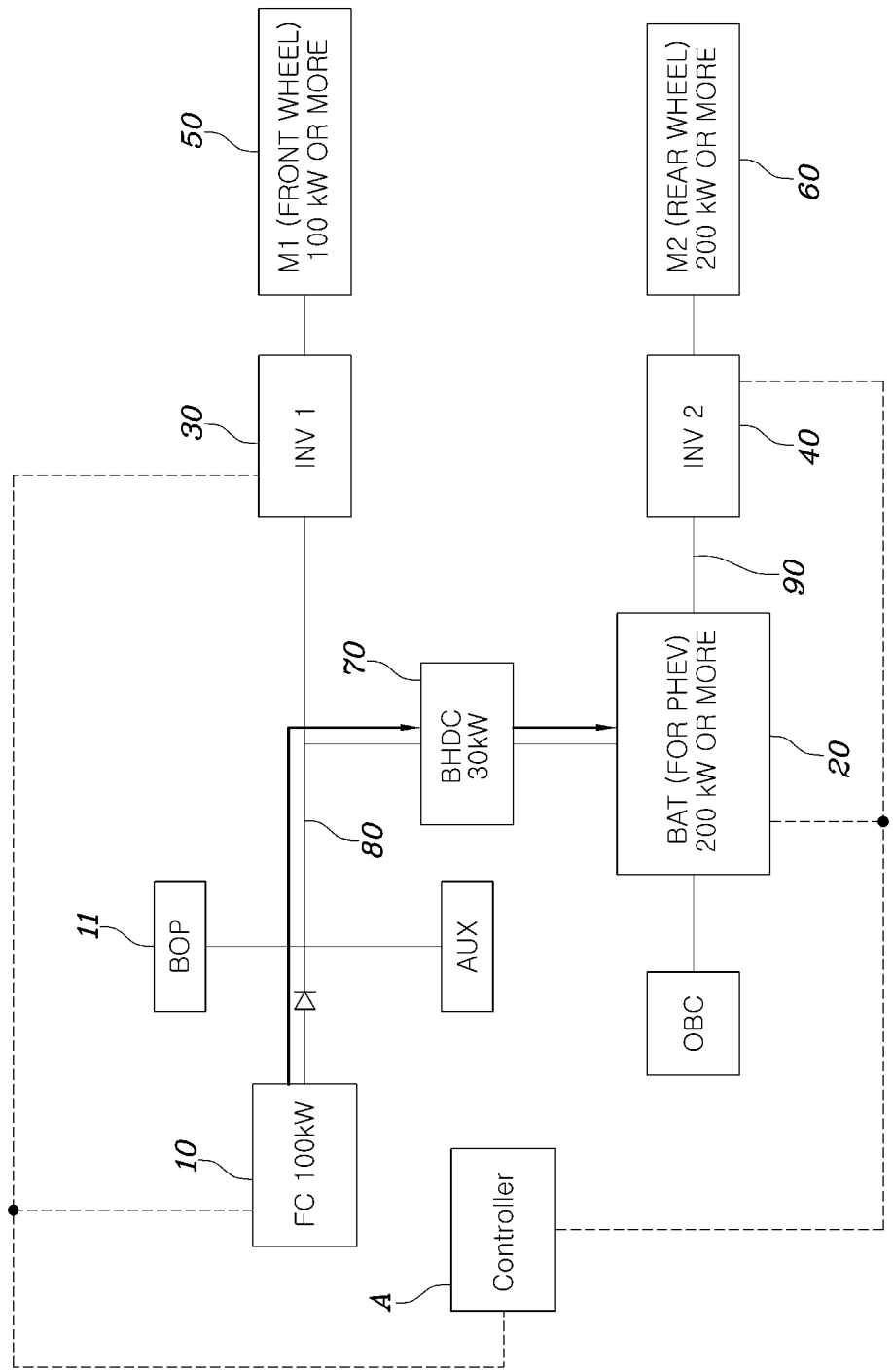

FIG. 4 illustrates a mode in which the high voltage battery 20 is charged using the fuel cell 10. The high voltage battery 20 may perform plug-in charging using an external power source, but may also charge the generated power of the fuel cell 10 through the bidirectional DC/DC converter 70.

In particular, the high voltage battery 20 may be charged with the generated power of the fuel cell 10 during the operation of the fuel cell 10. In other words, the high voltage battery 20 may be charged with the remaining power when the power of the fuel cell 10 is generated during, for example, the starting off of the fuel cell 10 but the fuel cell vehicle is not operating or the like, or the high voltage battery 20 may also be charged with a part of the power while the first motor 50 is driven when the SOC of the high voltage battery 20 is insufficient while the fuel cell vehicle is operating with the generated power of the fuel cell 10.

Figure 5:
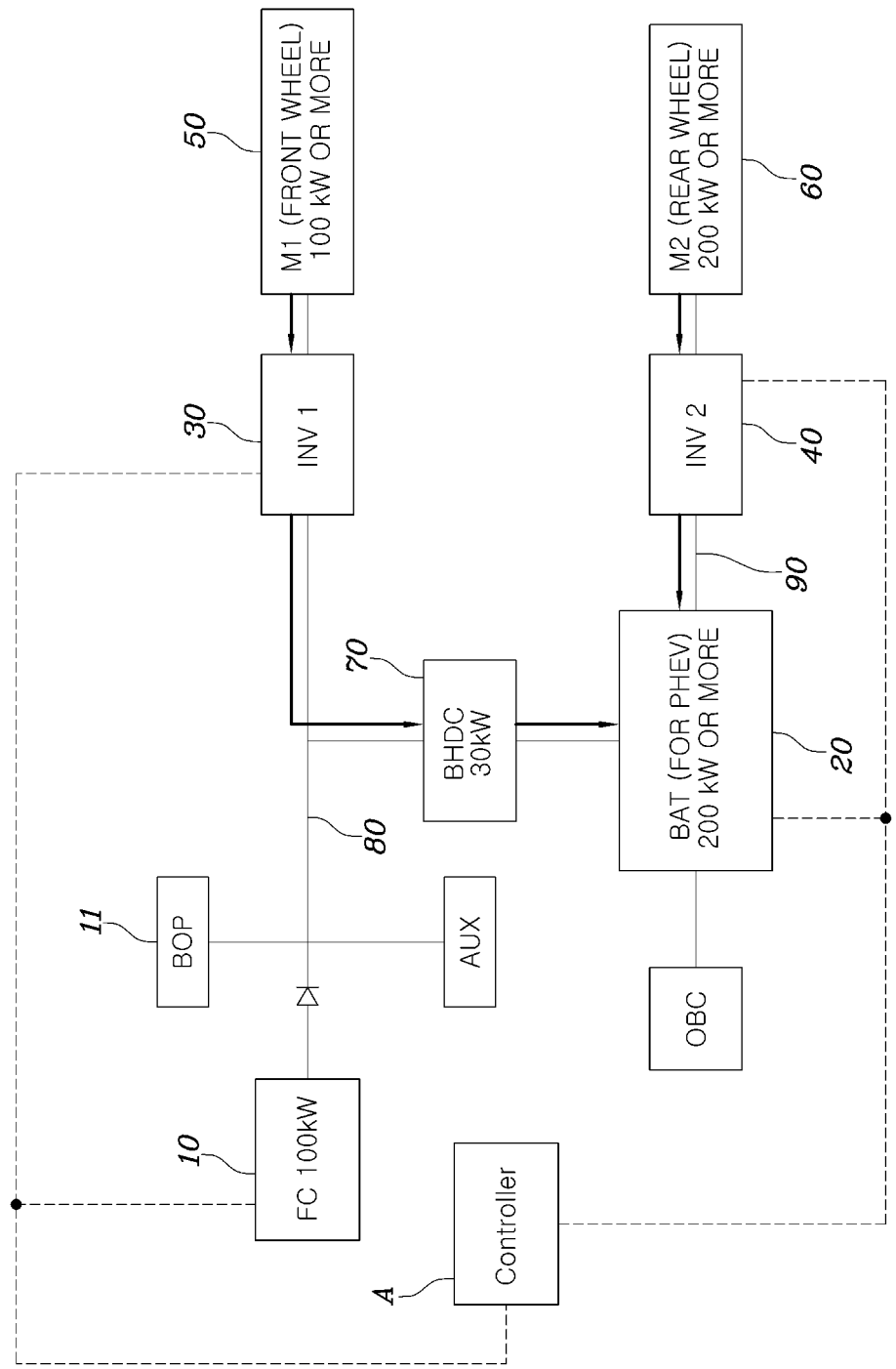

FIG. 5 illustrates the regenerative braking mode. Specifically, when the regenerative braking is being performed while the fuel cell vehicle is operating, the high voltage battery 20 may be charged with energy regenerated by each of the first motor 50 and the second motor 60. The energy regenerated by the second motor 60 may be transmitted to the high voltage battery 20 through the second inverter 40 and the energy regenerated by the first motor 50 may be transmitted to the high voltage battery via the first inverter 30 and the bidirectional DC/DC converter 70.

Figure 6:
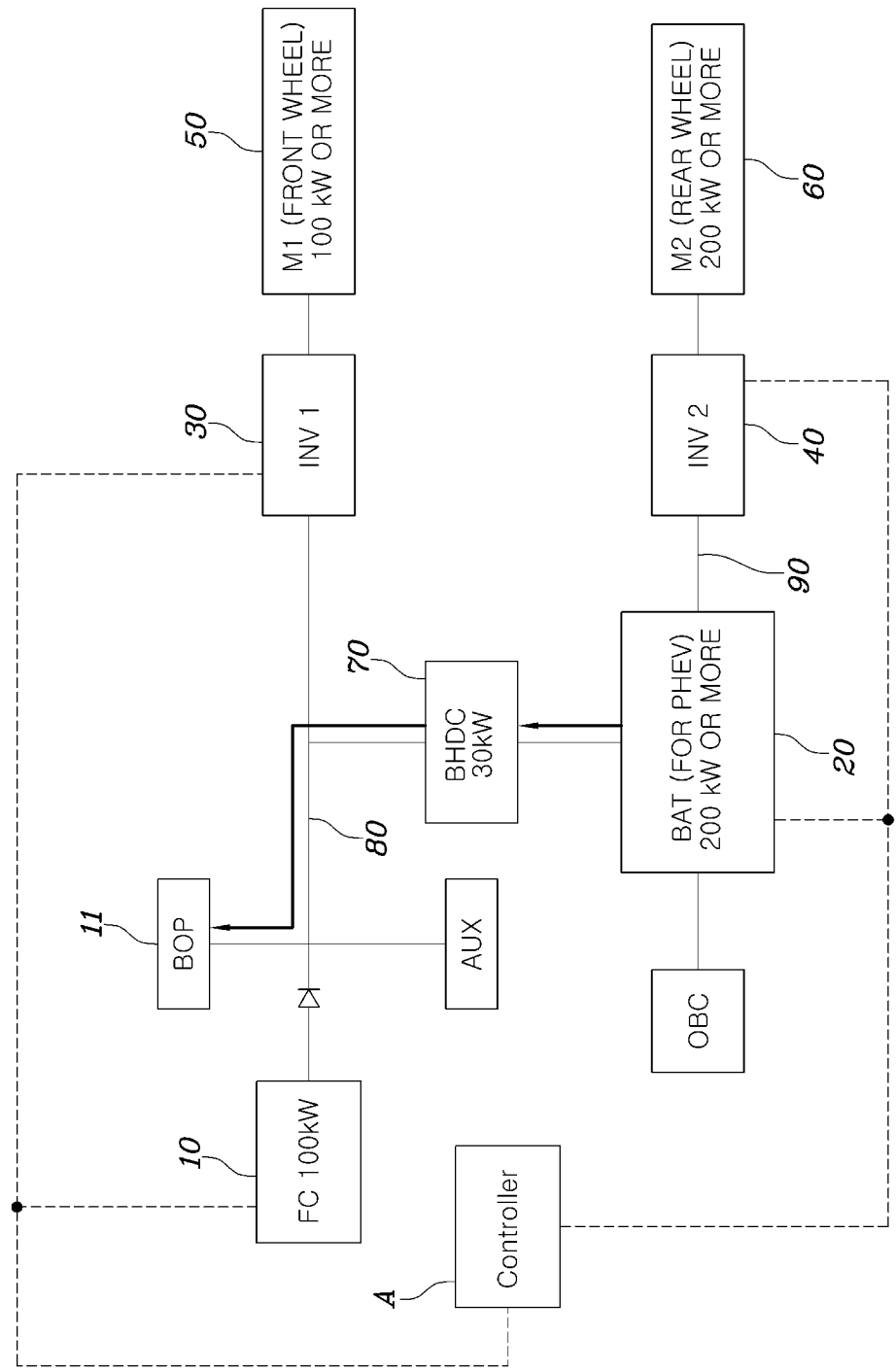

FIG. 6 illustrates a mode in which the power of the high voltage battery 20 is transmitted to the BOP (accessories). Specifically, the power discharged from the high voltage battery 20 may be transmitted to the BOP via the bidirectional DC/DC converter 70 to operate the BOP. When the fuel cell 10 requires air supply or the like for power generation when starting the fuel cell 10, the BOP of the air compressor or the like may be driven using the power of the high voltage battery 20.

Accordingly, a method of controlling a fuel cell vehicle system according to an exemplary embodiment of the present invention may operate the driving wheels of the fuel cell vehicle in any one of the EV mode in which the fuel cell vehicle is driven by the power of the high voltage battery 20, the FC Only mode in which the fuel cell vehicle is driven by the power of the fuel cell 10, and the high output mode in which the fuel cell vehicle is driven using both of the power of the high voltage battery 20 and the power of the fuel cell 10, based on the running state of the fuel cell vehicle.

Figure 7:
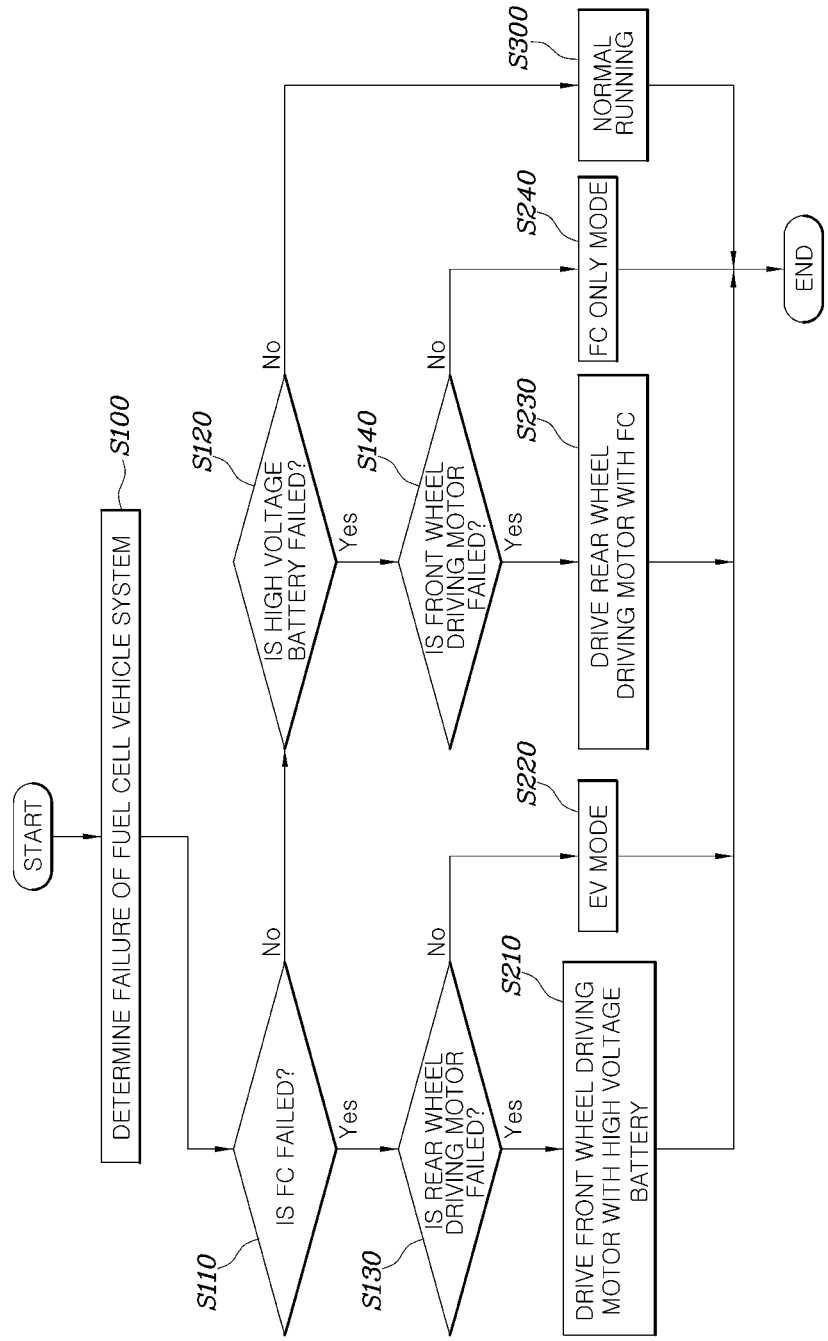
FIG. 7 is a flow chart of a method of controlling a fuel cell vehicle system according to an exemplary embodiment of the present invention.

FIG. 7 is a flow chart of a method of controlling a fuel cell vehicle system according to an exemplary embodiment of the present invention. The method described herein below may be executed by a controller (A). Referring to FIG. 7, the fuel cell vehicle system according to the exemplary embodiment of the present invention may include diagnosing a failure state of the fuel cell vehicle system (S100); and operating the driving wheels of the fuel cell vehicle in the selected driving mode based on the diagnosed failure condition (S210, S220, S230, S240, and S300).

In other words, the method may diagnose the failure condition of the fuel cell vehicle system to control a fuel cell vehicle to enter a fail-safe mode since a dangerous situation may be caused when the fuel cell vehicle is unable to be operated suddenly due to the failure of any components of the system. Specifically, in the diagnosing of the failure state of the fuel cell vehicle system (S100), whether the fuel cell and the high voltage battery may supply power may be determined, and whether the first motor or the second motor may supply a driving torque may be determined. The failure of the first inverter or the second inverter may also be diagnosed.

Particularly, the failure of the high voltage battery may also include the case in which the power may not be supplied temporarily due to the situations such as the SOC of a high voltage battery being insufficient or the temperature not being at an appropriate level. In the diagnosing of the failure state of the fuel cell vehicle system (S100), when no failure in the components of the system is detected, the fuel cell vehicle may be operated in a normal running mode (S300). The fuel cell vehicle may be operated in an appropriate running mode based on the running state described above.

When a failure of the fuel cell is detected (S110), the driving wheel may be operated in the driving mode in which the first motor or the second motor is driven with the power of the high voltage battery (S220). In other words, when the fuel cell is unable to generate power, the fuel cell vehicle may enter the EV mode in which the fuel cell vehicle is driven with the power of the high voltage battery. The driving wheel may be operated in the driving mode in which the first motor or the second motor is driven with the power of the high voltage battery. Although the power of the high voltage battery may be supplied to the first inverter by passing through the bidirectional DC/DC converter to drive the first motor, the power of the high voltage battery may be directly supplied to the second inverter in consideration of the loss due to the converting to drive the second motor.

Figure 8:
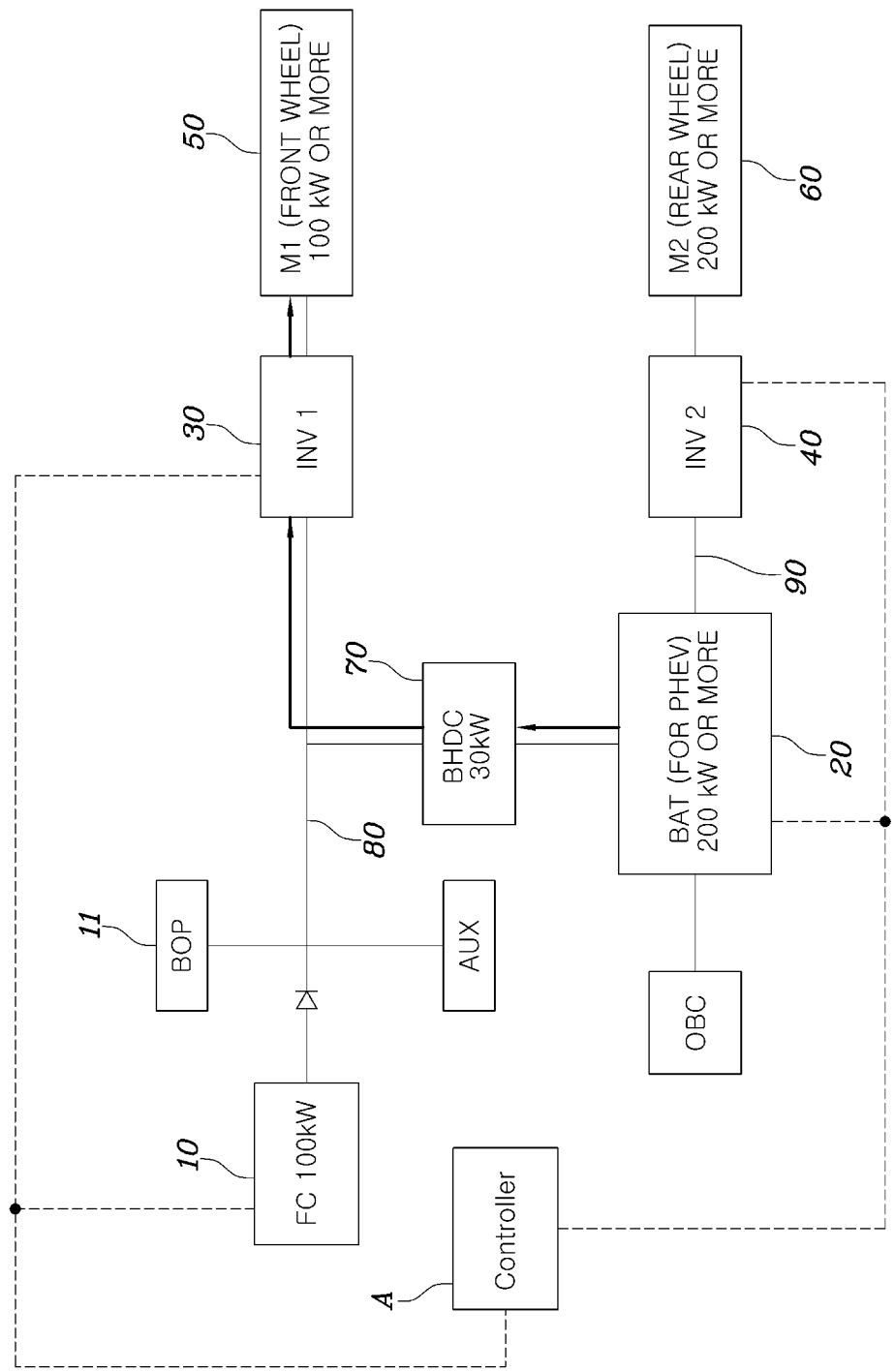
FIG. 8 is a diagram illustrating a driving mode when a fuel cell and a second motor according to an exemplary embodiment of the present invention fail.

FIG. 8 is a diagram illustrating a driving mode when a fuel cell and a second motor according to an exemplary embodiment of the present invention fail. Referring to FIG. 8, when a failure of the second motor is also detected (S130), in the operating of the driving wheel of the fuel cell vehicle (S210), the bidirectional DC/DC converter may be operated to supply the power of the high voltage battery to the first bus terminal, to thus operate the driving wheel in the driving mode in which the first motor is driven.

Therefore, when the fuel cell and the second motor fail at the same time, the power of the high voltage battery may be supplied to the first motor to operate the driving wheel in an emergency operation mode in which the driving wheel is driven with the first motor. Accordingly, even when the fuel cell and the second motor fail at the same time, an emergency operation of moving the fuel cell vehicle to a safe place may be executed.

Furthermore, when a failure of the high voltage battery is detected in the diagnosing of the failure (S120), in the operating of the driving wheel of the fuel cell vehicle (S240), the driving wheel may be operated in the driving mode in which the first motor or the second motor is driven with the power of the fuel cell. In other words, when the power is unable to be supplied from the high voltage battery, the first motor or the second motor may be driven using the power of the fuel cell. However, although the power of the fuel cell may be supplied to the second inverter by passing through the bidirectional DC/DC converter to drive the second motor, it the power of the fuel cell may be directly supplied to the first inverter in consideration of the loss due to the converting to drive the first motor.

Figure 9A:
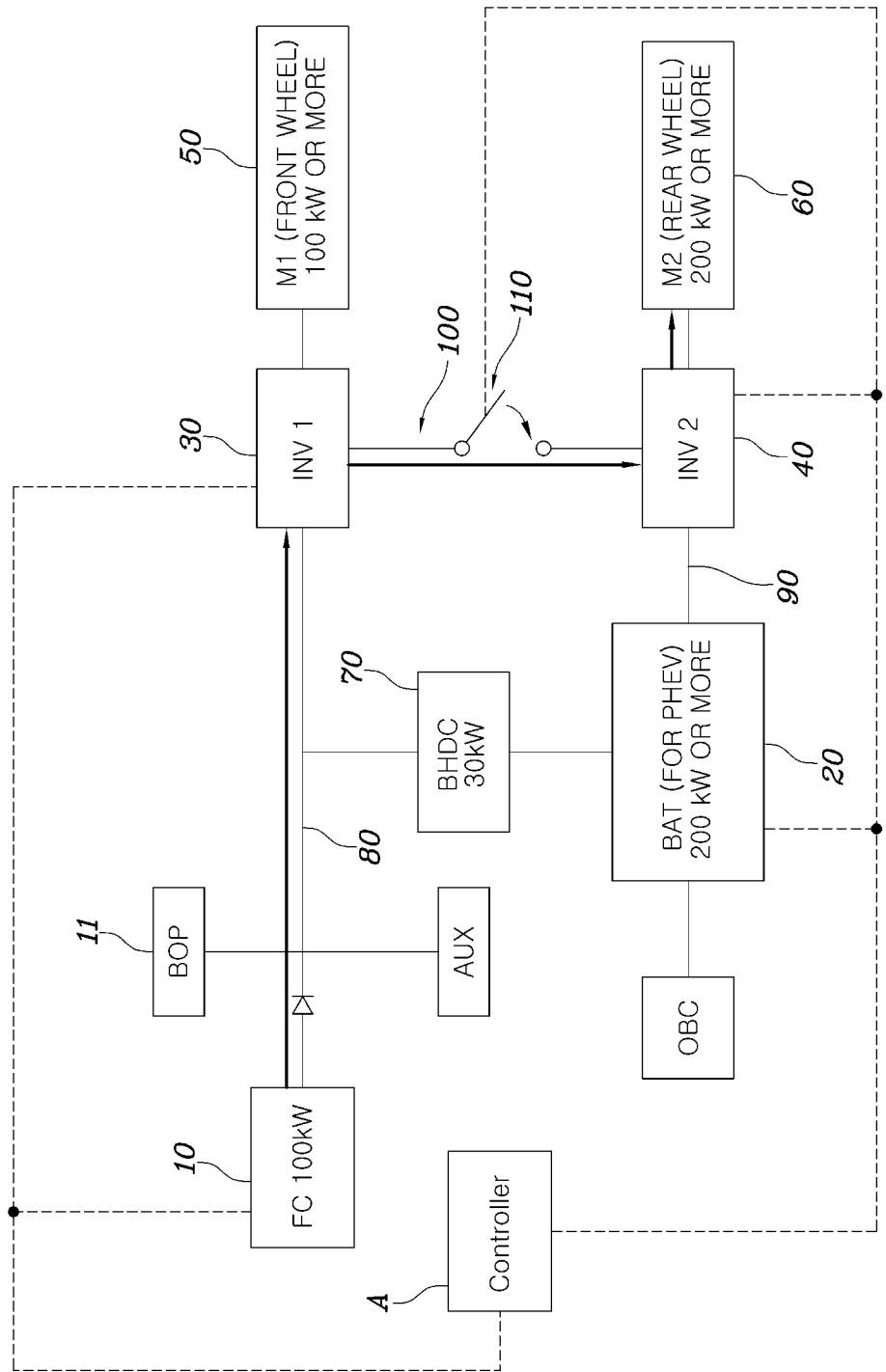
FIGS. 9A and 9B are diagrams illustrating a driving mode when a high voltage battery and a first motor according to an exemplary embodiment of the present invention fail.
Figure 9B:
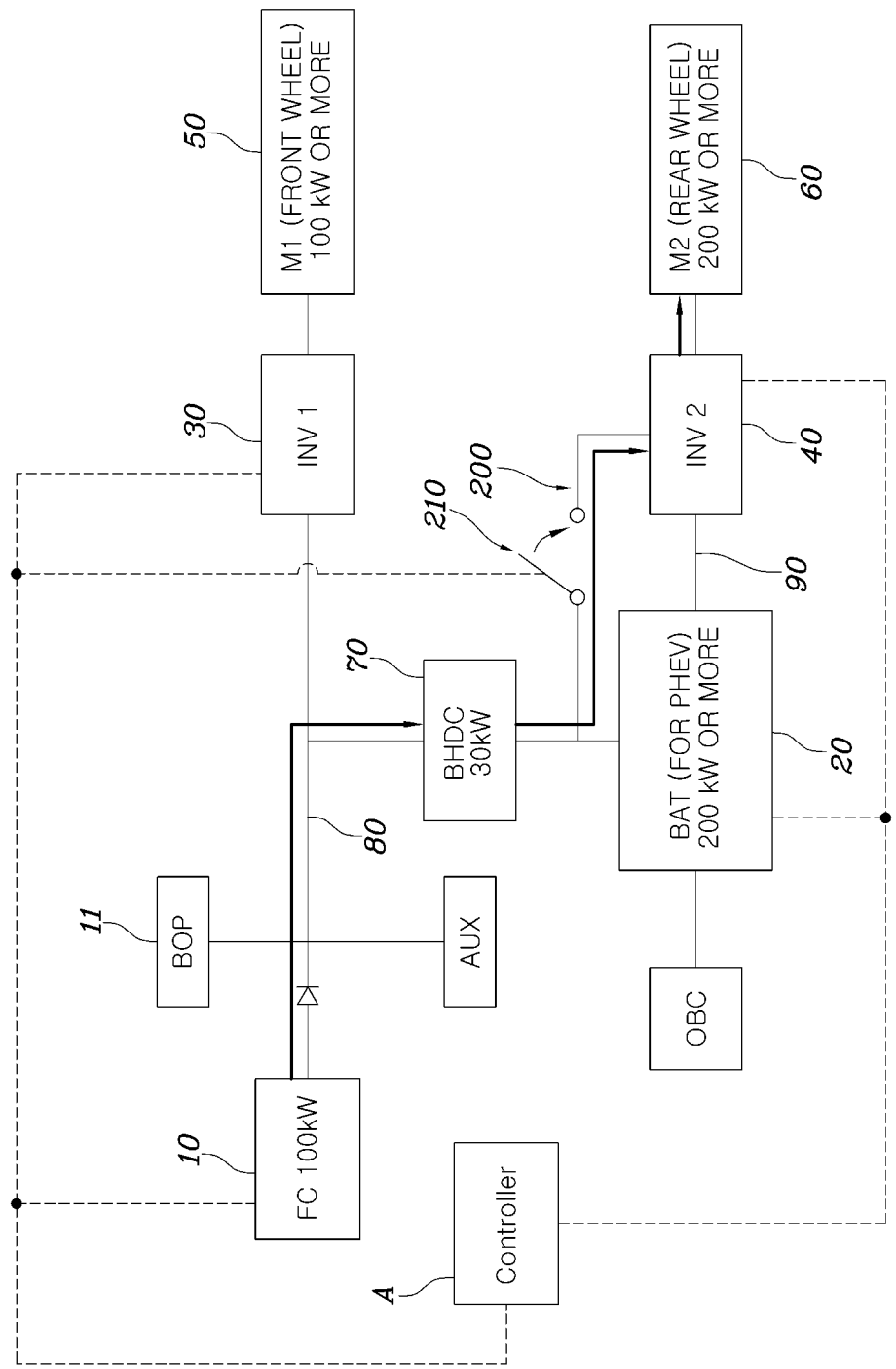

FIGS. 9A and 9B are diagrams illustrating a driving mode when a high voltage battery and a first motor according to an exemplary embodiment of the present invention fail. Referring to FIGS. 9A and 9B, when the first motor is also diagnosed as having failed in the diagnosing of the failure (S140), in the operating of the driving wheel of the fuel cell vehicle (S230), the bidirectional DC/DC converter may be operated to supply the power of the first bus terminal to the second inverter, thereby driving the second motor.

Since the high voltage battery has failed, the power may not be supplied from the high voltage battery even when the power is supplied to the high voltage battery by passing through the bidirectional DC DC converter. Therefore, as illustrated in FIG. 9A, a first switch 110 may be operated to directly connect the power transmitted to the first inverter to the second inverter through the first relay. Since the power of the first inverter has a voltage less than the voltage of the power of the second inverter, the power of the first inverter may be supplied to the second inverter, but the supply of the power of the second inverter having a greater voltage to the first inverter may additionally cause a failure of components.

Alternatively, as illustrated in FIG. 9B, the second switch 210 may be operated so that the power passing through the bidirectional DC/DC converter bypasses the high voltage battery to be supplied to the second inverter through the second relay directly transmitting power to the second inverter. Therefore, when the high voltage batter and the first motor fail at the same time, the power of the fuel cell may be supplied to the second motor to operate the driving wheel in the emergency operation mode in which the driving wheel is driven with the second motor. Accordingly, even when the high voltage battery and the first motor fail at the same time, an emergency operation of enabling movement to a safe place may be executed.

For reference, it is not assumed that the fuel cell and the high voltage battery fail at the same time or the first and second motors fail at the same time. In such a case, the failure may not be solved by the emergency operation control of the present invention, and therefore another emergency operation control may be provided separately.

Figure 10A:
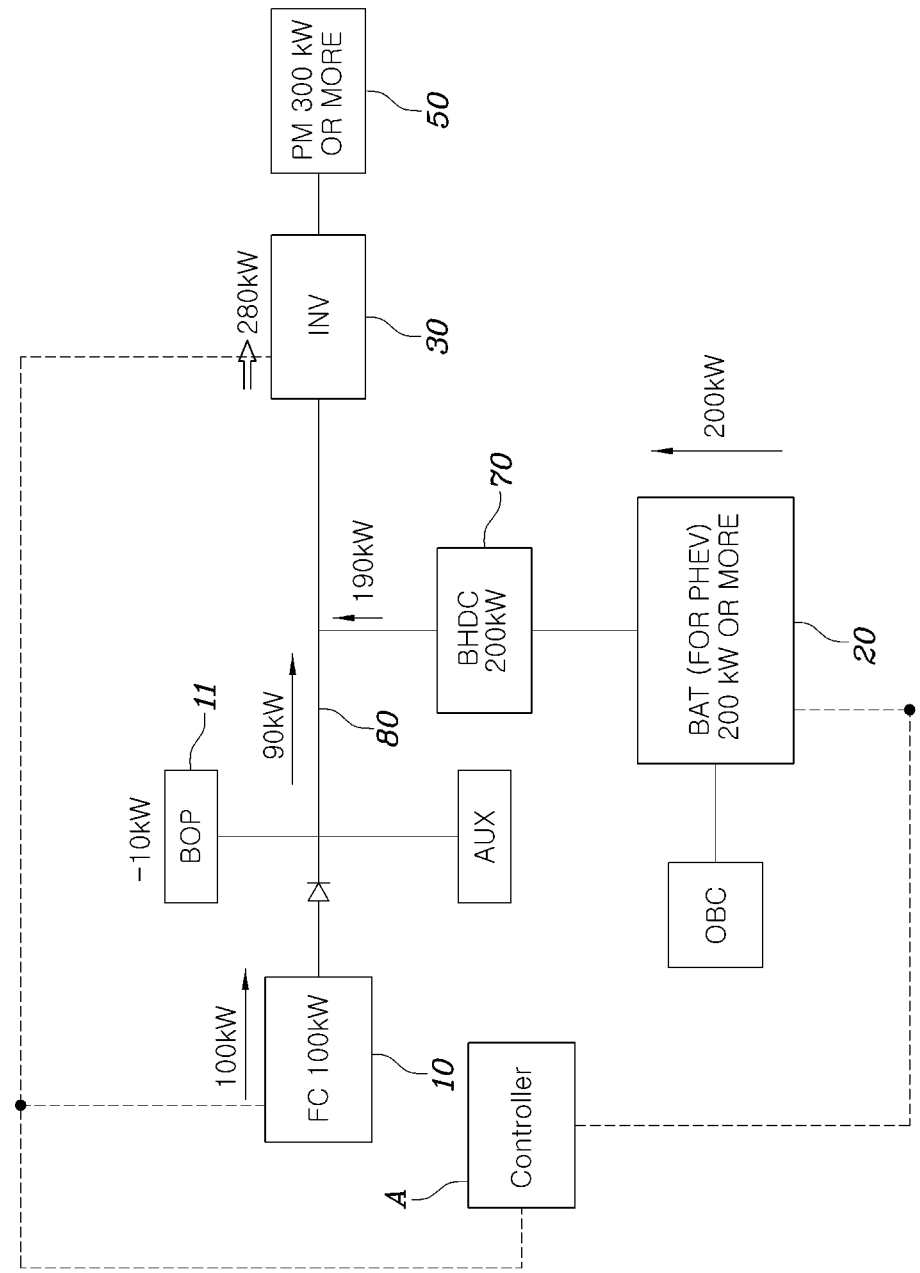
FIGS. 10A and 10B are comparison diagrams of the existing fuel cell vehicle system with the fuel cell vehicle system according to the exemplary embodiment of the present invention.
Figure 10B:
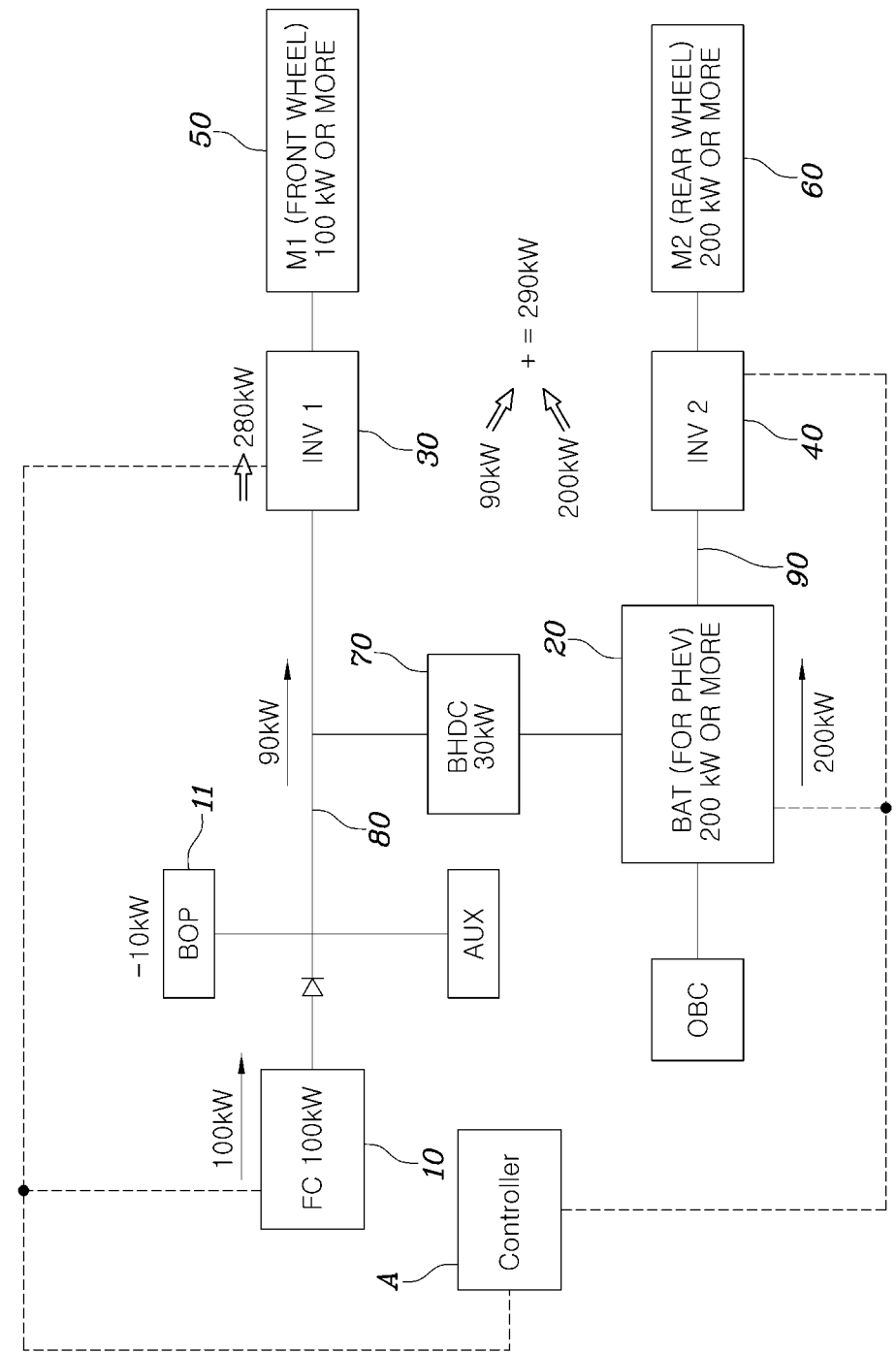

FIGS. 10A and 10B are comparison diagrams of the existing fuel cell vehicle system with the fuel cell vehicle system according to the exemplary embodiment of the present invention. Referring to FIGS. 10A and 10B, it is assumed that an output of 300 [kW] is generated in the same manner. Specifically, it is assumed that the fuel cell supplies an output of 100 [kW], the high voltage battery supplies an output of 200 [kW], and the BOP consumes 10 [kW].

FIG. 10A shows the existing fuel cell vehicle system, in which the fuel cell system may be configured to supply 90 [kW] by allowing the fuel cell to supply an output of 100 [kW] and the BOP to consume 10 [kW], and may be configured to supply 190 [kW] by allowing the high voltage battery to supply an output of 200 [kW] and the bidirectional DC/DC converter to consume about 10 [kW] due to the converting. Therefore, according to the existing fuel cell vehicle system, even when the total output is 300 [kW], the power supplied to the inverter connected to the motor may be 280 [kW], and thus the driving wheel may provide the driving torque corresponding to 280 [kW].

FIG. 10B illustrates the fuel cell vehicle system according to the exemplary embodiment of the present invention. The fuel cell vehicle system may be configured to supply 90 [kW] to the first inverter by allowing the fuel cell to supply an output of 100 [kW] and the BOP to consume 10 [kW] and supply an output of 200 [kW] from the high voltage battery to the second inverter. Therefore, according to the fuel cell vehicle system according to the exemplary embodiment of the present invention, when a total of 300 [kW] is output, the power supplied to the first inverter and the second inverter connected to the first motor and the second motor, respectively, is a total of 290 [kW] and thus the driving wheel may provide a driving torque corresponding to a total of 290 [kW]. In other words, since the converting is not executed using the bidirectional DC/DC converter in the normal running mode, the power to be lost may be reduced and the driving efficiency may be increased accordingly.

According to the fuel cell vehicle system and the method of controlling the same of the present invention, the fuel cell and the high voltage battery may be used independently without the power conversion of the bidirectional converter, thereby increasing the driving efficiency. In addition, since the required power conversion capacity of the bidirectional converter is minimal and therefore the small-sized bidirectional converter is sufficient, it may be advantageous in terms of layout and cost reduction. When the fuel cell, the high voltage battery, the first motor, or the second motor fails, the fail-safe mode may be improved.

Although the present invention has been shown and described with respect to specific exemplary embodiments, it will be obvious to those skilled in the art that the present invention may be variously modified and altered without departing from the spirit and scope of the present invention as defined by the following claims

What is claimed is:

1. A method of controlling a fuel cell vehicle system, comprising:
   a fuel cell;
   a first motor connected to the fuel cell via a first bus terminal and driven by power supplied from the fuel cell and configured to provide power to driving wheels of the vehicle;
   a high voltage battery configured to store or supply power by charging or discharging;
   a second motor connected to the high voltage battery via a second bus terminal and driven by power supplied from the high voltage battery and configured to provide power to the driving wheels of the vehicle;
   a bidirectional direct current-direct current (DC/DC) converter positioned between the first bus terminal and the high voltage battery; and
   a controller configured to operate the bidirectional DC/DC converter to adjust a transmission of power between the first bus terminal and the high voltage battery, the method comprising:
   diagnosing, by the controller, a failure state of the fuel cell vehicle system; and
   operating, by the controller, a driving wheel of the fuel cell vehicle in a driving mode selected based on the diagnosed failure state,
   wherein when the fuel cell is diagnosed as having failed, the driving wheel is operated in a driving mode in which a first motor or a second motor is driven with the power of the high voltage battery, and
   wherein when the second motor is diagnosed as having failed, the bidirectional DC/DC converter is operated to supply the power of the high voltage battery to a first bus terminal to operate the driving wheel in a driving mode in which the first motor is driven.

2. The method of claim 1, wherein when the high voltage battery is diagnosed as having failed, the driving wheel is operated in a driving mode in which the first motor or the second motor is driven with the power of the fuel cell.

3. The method of claim 2, wherein when the first motor is diagnosed as having failed, the bidirectional DC/DC converter is operated to provide the power of the first bus terminal to a second inverter to drive the second motor.

* * * * *